United States Patent

[11] 3,550,758

| [72] | Inventor | Peter Stalker |
| | | 127 Bridge St. E, Belleville, Ontario, Canada |
| [21] | Appl. No. | 770,365 |
| [22] | Filed | Oct. 24, 1968 |
| [45] | Patented | Dec. 29, 1970 |

[54] IDLER ROLLER FOR CONVEYOR BELTS
4 Claims, 4 Drawing Figs.

[52] U.S. Cl. .................................................. 198/192,
193/37, 308/20
[51] Int. Cl. ...................................................... B65g 15/08
[50] Field of Search .......................................... 198/192;
193/35, 37; 184/6, 7, 8; 308/106, 20, 18, 172, 170

[56] References Cited
UNITED STATES PATENTS

| 3,334,727 | 8/1967 | Rieser | 308/20 |
| 3,332,536 | 7/1967 | Ebly et al. | 198/192 |
| 3,221,868 | 12/1965 | Ricker et al. | 198/192 |

*Primary Examiner*—Evon C. Blunk
*Assistant Examiner*—Alfred N. Goodman
*Attorney*—Arne I. Fors and Frank I. Piper ABSTRACT: An idler for conveyor belts having a shaft positioned at right angles to the direction of travel of the belt and a number of rollers spaced along the length of the shaft. A spacer is positioned on the shaft between each roller. Lubricant is introduced through nipples at the ends of the shaft and passes through a channel to the bearing surface of each roller. Sealing members are secured to each sidewall of the rollers and the facing spacer walls to retain lubricant therebetween and in contact with the bearing surface of each roller. A spiral groove is formed in the sidewalls of each roller. Upon rotation of the roller, the lubricant is pressurized within the groove.

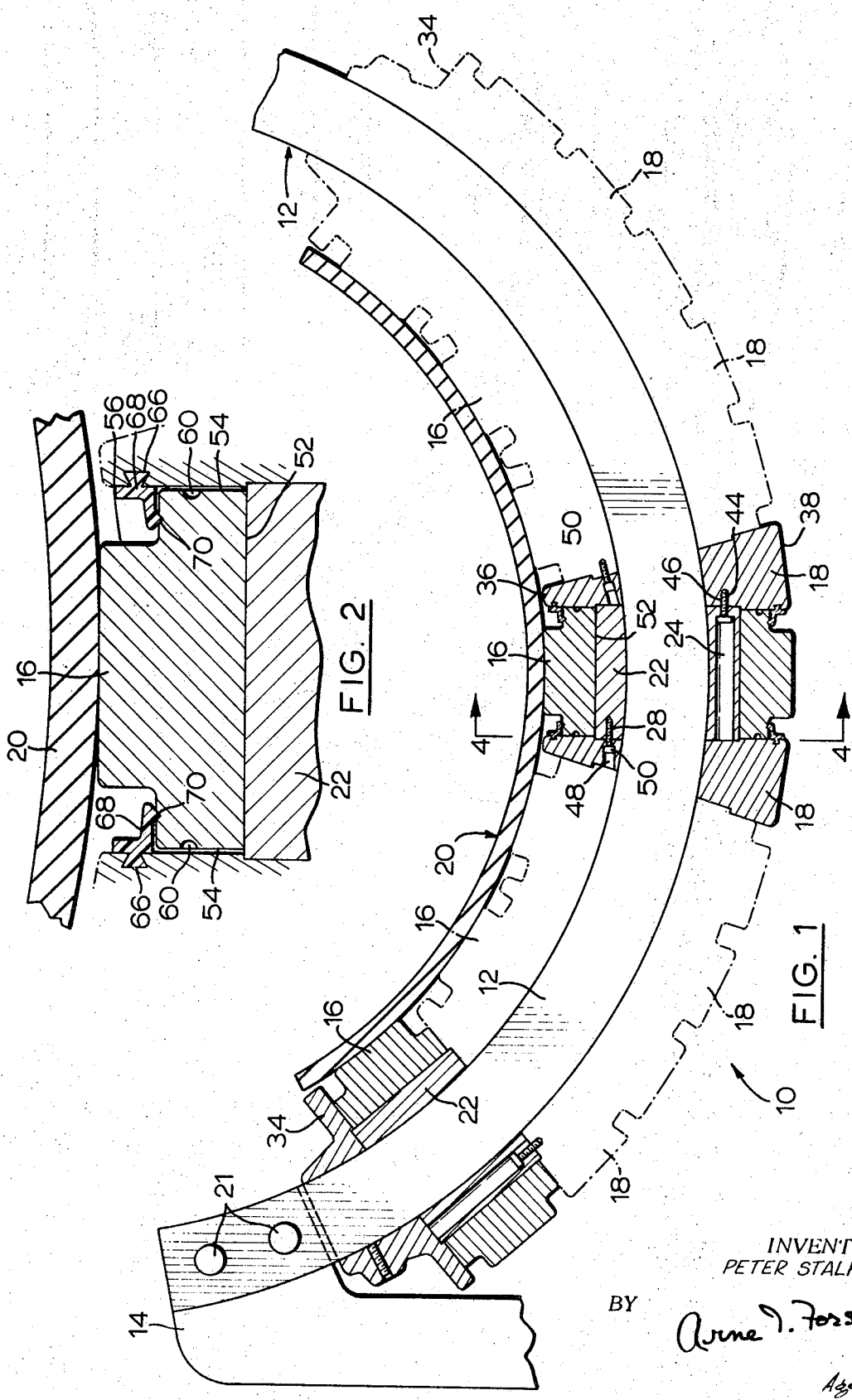

INVENTOR.
PETER STALKER

BY Arne J. Fors

Agent 3,550,758

IDLER ROLLER FOR CONVEYOR BELTS

This invention relates to idlers for conveyor belts and more particularly to an improved idler having a multiplicity of rollers formed along the length thereof and capable of supporting a rapidly moving conveyor belt.

It is well known to support conveyor belts by a number of idlers positioned laterally and spaced regularly along the length of the belt. To increase the capacity and useful life of a belt, it is desirable to support the belt by idlers which train the belt into the arc of a circle.

Idlers are known which have a number of rollers spaced along a curved shaft. Commonly, such idlers have three rollers rotatably mounted about a single shaft. Such an arrangement of rollers gives rise to pronounced bends in the belt as it travels over the rollers. The bends occur in those areas of the belt which pass over the space between adjacent rollers. To increase the capacity of the belt, the two outer rollers must be moved to a more vertical position. In so doing the bends in the belt become more exaggerated and the effective life of the belt reduces.

To overcome this problem it has been suggested that the number of rollers be increased. As the number of rollers increases however, so also does the number of antifriction bearing elements required. In order to reduce the sharpness of the bends and provide proper belt support it is necessary to reduce the size of bearing elements at both ends of each roller forming a part of the idler. In so doing the maximum rate of travel of the belt before failure of the bearings reduces.

It is accordingly an object of the present invention to provide an idler capable of supporting a rapidly moving conveyor belt and about which a comparatively large number of rollers may be mounted per unit length thereof thereby permitting the belt to be trained substantially into an arcuate shape.

It is another object to provide an idler having means for pressurizing the roller lubricant in direct proportion to the rate of rotation whereby metal to metal wear is reduced regardless of the orientation of the rollers.

It is another object to provide an idler having relatively few moving parts and being relatively inexpensive of manufacture and simple of assembly.

These objects may be accomplished by providing an idler for conveyor belts including a rigid shaft; means for supporting the shaft; a plurality of spacers and rollers axially aligned along the length of the shaft so that each roller is disposed between contiguous spacers, each spacer being secured to the shaft and each roller being rotatably mounted about the shaft and having an inner bearing surface, spaced sidewalls and an outer wall adapted to form a seat for the conveyor belt, each sidewall of the roller having at least one spiral groove formed therein, the groove being directed outwardly from the longitudinal axis of the roller in the intended direction of rotation of the roller; and a liquid seal between the sidewalls of the roller and the facing spacer walls to retain lubricant therebetween and in contact with the inner bearing surface of the roller.

A fuller understanding of the invention may be had by referring to the description of a preferred embodiment of the idler, taken in conjunction with the accompanying drawings in which:

FIG. 1 is an elevation, partly in section, of the idler according to the invention;

FIG. 2 is an enlarged sectional view of a central roller and sleeve shown in FIG. 1;

Like reference characters refer to like parts throughout the description of the drawings.

Figure 3:
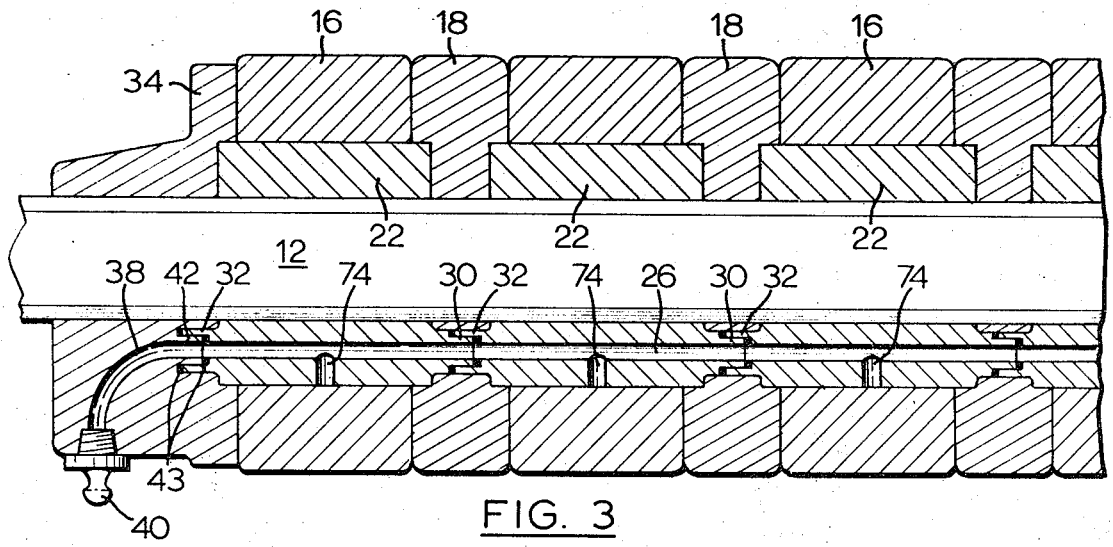
FIG. 3 is a top plan view, in section, partially in schematic, of a portion of the idler.

With reference to the drawings, the invention is shown incorporated into conveyor idler generally designated by the numeral 10 composed of shaft 12, brackets 14, a plurality of rotatably mounted rollers 16, spaced apart by spacers 18 and belt 20 seated on rollers 16. As shown, roller 16 and idlers 18 are axially aligned along the length of shaft 12.

As seen in FIG. 1, shaft 12 is generally arcuate in shape and is composed of a single bar having a generally square cross section. The ends of shaft 12 are inserted in sockets formed in brackets 14 (only one shown). Bore holes 21 are formed in the end portions of shaft 12 for receipt of bolts (not shown) which pass through the walls of the sockets to secure the end portions to brackets 14. Brackets 14 are secured to a supporting frame structure which is not shown. The structure may take any one of a number of different forms well known to those skilled in the art.

Figure 4:
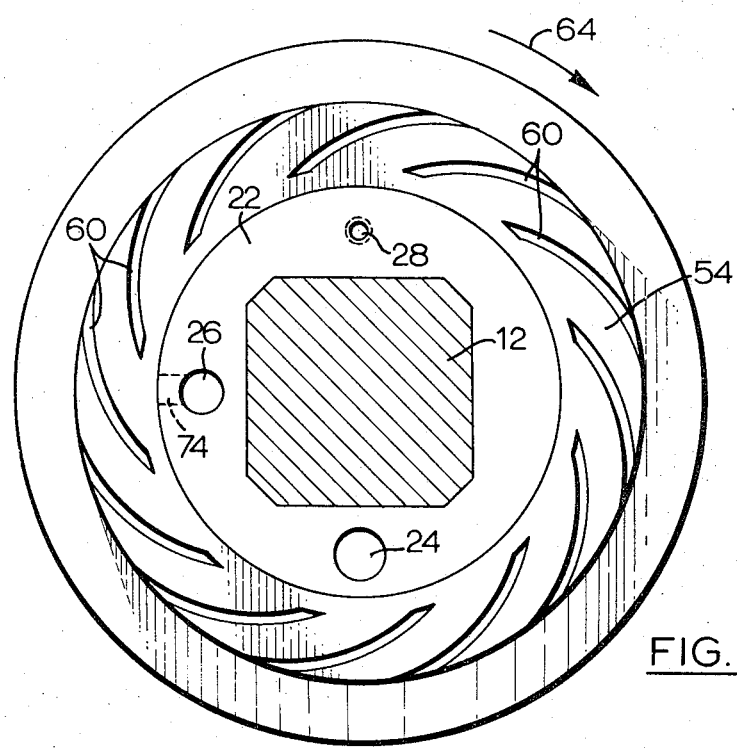
FIG. 4 is a side view on line 4—4 of FIG. 1.

A number of sleeves 22 are spaced along the length of shaft 12. As seen in FIG. 4, an aperture of square cross section is formed in each sleeve 22 to fit shaft 12 in order that no rotation of sleeve 22 may take place about shaft 12. Channel 26 and openings 24 and 28 are also formed in sleeve 28. Channel 26 has a longitudinal axis parallel to the corresponding axis of shaft 12.

Each sleeve 22 is separated from adjacent sleeves 22 by intermediate spacers 18. Terminal spacer 34 is provided at each end of shaft 12. Each spacer 18 and 34 has a generally circular peripheral edge and an opening of generally square cross section to fit shaft 12. As seen in FIG. 1, each spacer 18 is generally wedge-shaped in cross section having a nonuniform thickness varying from a minimum indicated by the numeral 36 above which belt 20 travels to a maximum indicated by the numeral 38. The surface of spacer 18 at 38 defines in part the peripheral lower edge of idler 10.

Openings 24 and 28 in sleeve 22 are provided to permit attachment to the spacer 18 or 34 contiguous thereto. As seen in FIG. 1, bolt 44 is inserted into each opening 24 and is threadably received in bore 46 formed in spacer 18. Opening 48 in spacer 18 is provided for receipt of bolt 50 for threadable receipt in corresponding opening 28 in sleeve 22.

A roller 16 is positioned for rotation about each sleeve 22. Each roller 16 has a circular inner bearing surface 52, a pair of sidewalls 54 meeting at an inner edge and a stepped outer wall 56 meeting sidewalls 54 at an outer edge. The stepped outer wall 56 is composed of an inner raised portion on which belt 30 is seated and outer portions. Sidewalls 54 face corresponding walls of adjacent spacers 18. As shown in FIG. 4, a plurality of parallel spiral grooves 60 are formed in each sidewall 54. As shown, each groove is directed outwardly from the longitudinal axis of roller 16 in the intended direction of rotation of roller 16 (indicated by the arrow marked 64). Mortises 66 are cut into the spacer sidewalls for receipt of corresponding tenons formed on stationary ring-shaped seal members 68 in a dovetail manner. V-shaped mortises 70 are cut into the outer portions of outer walls 56 for receipt of corresponding tenons formed on the end of seal member 68 opposite the dovetail-shaped tenon.

As seen in FIG. 3, channel 26 formed in each sleeve 22 terminates at one end in a protruding stepped male port 30 and at the other end in a protruding female port 32. The outer diameter of male port 30 is slightly less than the inner diameter of female port 32 to enable male port 30 of one sleeve 22 to be fitted into the female port 32 of a contiguous sleeve 22. Each spacer 18 has an opening to accommodate mating ports 30 and 32 of sleeves 22.

A second channel 74 is provided in each sleeve 22. Each channel 74 commences midway of the ends of channel 26 and terminates at the peripheral bearing surface of sleeve 22.

A channel 38 is bored in each terminal spacer 34. Nipple 40 is threadably secured to spacer 34 at one end of channel 38. Male port 42 is formed at the opposite end of channel 38. Male port 42 is adapted to be slid into female port 32 of the contiguous sleeve 22. Sealing washers 43 are placed about male ports 30 and 42 before being fitted into female ports 32 in order to produce a liquidtight connection between lubricating channels 38 and 26 of contiguous sleeves 22 and between terminal spacers 34 and contiguous sleeves 22.

Channels 26 and 38 are aligned to form a continuous channel between nipples 40 at opposite ends of shaft 12. Channels 26 and 38 are provided for the passage of lubricant, the lubricant being introduced into channels 38 and 26 through nipples 40 by any convenient means including a gun.

It will therefore be seen that lubricant introduced through nipples 40 may pass through channels 38 and 26 and outwardly to the bearing surfaces of each sleeve 22 and roller 16 through channels 74. Lubricant will pass between the bearing surfaces and be retained in the space between sidewall 54 and the facing spacer walls by sealing member 68. When rollers 16 rotate in the direction of arrow 64 in FIG. 4, a centripetal force will be exerted on the lubricant within grooves 60 which serves to pressurize the lubricant. The force will be in direct proportion to the speed of rotation of rollers 16 so that an increase in the speed of rotation results in an increase in the pressure of the lubricant between the bearing surfaces. Thus rollers 16 rotate on a film of pressurized lubricant and metal-to-metal wear is substantially prevented. If the speed of rotation is sufficient to provide the necessary lubricant pressure, the rollers may be oriented in any direction without appreciable wear of bearing surfaces.

It will be seen that idlers 10 may be easily assembled by placing in turn a terminal spacer 34 and a sleeve 22 on the shaft 12. Spacer 34 is then bolted to shaft 12 and sleeve 22 is bolted to spacer 34. A roller 16 is then placed about the sleeve. Sealing members 68 are then attached. An intermediate spacer 18 is then placed on shaft 12 and bolted to the sleeve. The remaining sleeves and spacers are placed in turn on the shaft to complete the idler.

Preferably sealing members 68 and sealing washers 43 are moulded of lubricant-resistant elastic rubber compound such as neoprene.

Modifications may be made in the preferred embodiment of the invention described and illustrated herein without departing from the scope and purview of the appended claims. For example, shaft 12 may assume a nonarcuate shape and may in fact be straight. It is of course unnecessary that it have a square cross section; it may be circular in which case sleeves 22 and spacers 34 and 18 will be keyed thereto. The lubricating channel may be formed in shaft 12. The preferred embodiment shown and described however, permits the idler to be built more cheaply and permits easier maintenance.

I claim:

1. An idler for conveyor belts including: a rigid shaft; means for supporting said shaft; a plurality of spacers and rollers axially aligned along the length of said shaft such that each said roller is disposed between contiguous said spacers, each said spacer being secured to said shaft and each said roller being rotatably mounted about said shaft and having an inner bearing surface, spaced sidewalls and an outer wall adapted to form a seat for said conveyor belt, each said sidewall having at least one spiral groove formed therein, said groove being directed outwardly from the longitudinal axis of said roller in the intended direction of rotation of said roller; and a liquid seal between said sidewall and the facing spacer walls to retain lubricant between said sidewalls and the facing spacer walls and in contact with said inner bearing surface.

2. An idler as claimed in claim 1 wherein said shaft is arcuate in shape.

3. An idler as claimed in claim 1 wherein each said roller is rotatable about a sleeve, said sleeve secured to said shaft and being positioned between contiguous spacers.

4. An idler as claimed in claim 1 further including a channel providing a passage to the flow of lubricant from a source to each said bearing surface.